United States Patent [19]

Ono

[11] Patent Number: 5,024,037
[45] Date of Patent: Jun. 18, 1991

[54] PROCESS FOR CONNECTION OF SUPPORTS, AND SUPPORT SYSTEM

[76] Inventor: Tatsuo Ono, 5-20-13, Matsugaoka Funabashi, Chiba, Japan

[21] Appl. No.: 333,465

[22] Filed: Apr. 5, 1989

[30] Foreign Application Priority Data

Dec. 28, 1988 [JP] Japan ............................ 63-331310

[51] Int. Cl.⁵ .......................................... E04H 12/18
[52] U.S. Cl. ...................................... 52/646; 403/49; 403/189; 403/174
[58] Field of Search .................... 52/646; 403/49, 198, 403/245, 246, 174, 178; 182/179

[56] References Cited

U.S. PATENT DOCUMENTS

| | | | |
|---|---|---|---|
| 4,039,264 | 8/1977 | Sharp | 182/179 X |
| 4,273,463 | 6/1981 | Dobersch | 403/49 X |
| 4,348,128 | 9/1982 | Gostling | 403/49 |
| 4,439,052 | 3/1984 | Wallther | 403/246 X |
| 4,840,513 | 6/1989 | Hackett | 403/49 |

FOREIGN PATENT DOCUMENTS

| | | | |
|---|---|---|---|
| 1163533 | 9/1969 | United Kingdom | 403/246 |
| 1386238 | 5/1975 | United Kingdom . | |
| 1470968 | 4/1977 | United Kingdom . | |
| 1542265 | 3/1979 | United Kingdom . | |
| 2086520 | 5/1982 | United Kingdom | 403/49 |

*Primary Examiner*—David A. Scherbel
*Assistant Examiner*—Lan Mai
*Attorney, Agent, or Firm*—McGlew & Tuttle

[57] ABSTRACT

Disclosed herein is a support system for use in forming a temporary scaffolding such as a prefabricated scaffolding, a temporary system such as a panel support, or a structure such as a truss-type pillar, tower, etc. The support system comprises columnar members each provided with a plurality of flanges along the longitudinal direction thereof, connecting members each provided with joint shoes at both ends thereof, and wedges each driven into the joint shoe, the flanges each comprising a supporting piece along the circumferential direction thereof, the joint shoes each comprising a hollow housing having a pair of opposed wall bodies, and a hook loosely fitted movably in the housing, the wall bodies and the hook being provided with respective wedge insertion holes opposed to each other, and the hook being provided at an end portion thereof with a catch portion to be engaged with the supporting piece of the flange. When the wedge is driven into the wedge insertion holes in the condition where the catch portion is opposed to the supporting piece, the hook is retracted with the result of engagement of the catch portion with the supporting piece, whereas end portions of the wall bodies are pushed outward into contact with the outer surface of the columnar member.

17 Claims, 9 Drawing Sheets

PROCESS FOR CONNECTION OF SUPPORTS, AND SUPPORT SYSTEM

BACKGROUND OF THE INVENTION

This invention relates to a process for connection of supports and a support system best suited not only for formation of a temporary scaffolding such as a prefabricated scaffolding or a temporary system such as a panel support but also for construction of a relatively long-lasting structure such as a truss-type pillar, tower, etc.

For formation of a temporary scaffolding such as a prefabricated scaffolding or a temporary system such as a panel support, etc., a support system is employed.

As the support system to be used in such situations, there has been provided a support system comprising simple pipes, as main members, and clamps as connecting means.

In recent years, however, there have been proposed inventive devices according to, for instance, Japanese Patent Publication Nos. 54-3407 (1979) and 58-15587 (1983), as a substitute for the above-mentioned system.

The invention proposals, in principle, comprise lontitudinal members and transverse members (and diagonal members) connected thereto.

The longitudinal member comprises a steel pipe member, as a main body, and a plurality of annular flanges having an appropriate width and welded to the outer peripheral surface of the steel pipe member at regular intervals along the axial direction of the pipe member.

In the inventive proposal according to the above-mentioned Japanese Patent Publication No. 54-3407 (1929), the flanges are each provided with substantially sectorial engaging portions constituted of cutouts through the material thickness of the flange, at arbitrary angular intervals, for instance, four engaging portions at 90° intervals.

On the other hand, the transverse members (and diagonal members) each comprise an appropriate length of steel pipe member, as a main body, and joint shoes fixed to both ends of the pipe member.

The joint shoe comprises a pair of wall bodies, which are disposed to face the upper and lower surfaces of the flange, with a wedge insertion hole provided at a central portion of each of the wall bodies.

A wedge is driven into the wedge insertion holes. When the wedge is driven into the wedge insertion holes, one side edge of the wedge is pressed against the aperture edges of the wedge insertion holes, while the other side edge is pressed against the inner periphery of the cutout in the flange.

In this case it is possible, according to the inventive proposal under consideration, to achieve fixed connection of the wall bodies at the tip of the joint shoe with the engaging portion of the flange.

Therefore, when the longitudinal members comprising the flanges are made to be columnar membres whereas the transverse members provided with the joint hoes are made to be horizontal members, with the diagonal members made to be connecting members such as brace members, and pluralities of the two types of members are assmbled by connecting them together using wedges, it is possible to form a desired temporary scaffolding such as a prefabricated scaffolding or a desired temporary system such as a panel support, in an arbitrary size.

On the other hand, in the inventive device according to the above-mentioned Japanese Patent Publication No. 58-15587 (1983), the flange is provided with a plinth-like supporting piece raised on an outer peripheral portion of the flange along the circumferencial direction, whereas the joint shoe is provided with a tip hook portion to be disengageably engaged with the supporting piece and is provided with a wedge insertion hole on the base end side thereof.

According to the inventive device, therefore, when the tip hook portion of the joint shoe is engaged with the supporting piece of the flange and wedging is conducted, it is possible to connect the transverse member to the columnar member extending from an arbitray direction relative to the columnar member.

In the inventive device according to the above-mentioned Japanese Patent Publication No. 54-3407 (1979), however, there is a limit to the number of cutouts provided as engaging portions in the flange, and the fitting positions of the joint shoe is limited by the number of the cutouts. Therefore, the number of the transverse members capable of being fitted is also limited.

In addition, a plurality of the flanges provided with the cutouts as engaging portions are fixedly arranged on the outer periphery of the columnar member at appropriate intervals along the vertical direction. There is therefore a problem that the cutouts formed in the flanges spaced apart vertically must be in register with each other, as viewed vertically.

Besides, in the inventive devies according to the above-mentioned Japanese Patent Publication Nos. 54-3407 (1979) and 58-15587 (1983), the joint shoes are engaged only with the flanges. When a vertical load is exerted on the transverse member, the stress is concentrated on the flange side, and there is a possibility of the flange being broken and the transverse member being disconnected from the longitudinal member.

Moreover, in the inventive devices according to the proposals mentioned above, the wedge is driven into the wedge insertion hole bored in the joint shoe so that one side edge of the wedge is pressed against the aperture edge of the wedge insertion hole whereas the other side edge of the wedge is pressed against the flange, as mentioned above.

In such conventional inventive devices as mentioned above, therefore, there is a tendency of the flanges being damaged upon driving of the wedges, leading to difficulties in repeated use of the longitudinal members provided with the flanges.

SUMMARY OF THE INVENTION

Accordingly it is an object of this invention to provide a process for connection of supports and a support system by which it is possible to connect freely an arbitrary number of connecting members to the outer peripheries of columnar members, in arbitrary directions relative to the columnar member.

It is another object of the invention to provide a process for connection of supports and a support system in which the vertical positions of the flanges provided on the columnar member are not restricted.

It is a further object of the invention to provide a process for connection of supports and a support system by which it is possible to distribute the loads on the connecting members to both the flanges and the columnar members.

It is still another object of the invention to provide a process for connection of supports and a support system by which it is possible to prevent the flanges from being broken or damaged.

It is yet further object of the invention to provide a process for connection of supports and a support system suited for formation of a temporary scaffolding such as a prefabricated scaffolding or a temporary system such as a panel support and for construction of a relatively long-lasting structure such as a truss-type tower.

To attain the above-mentioned objects, according to this invention there is provided a process for connection of supports which uses columnar members each provided with a plurality of flanges spaced apart along the longitudinal direction of the columnar members, connecting members each provided with joint shoes at end portions thereof, and wedges to be driven into the joint shoes, the flanges each provided with a supporting piece along the circumferential direction thereof, and the joint shoes each comprising a housing opened at one end, a hook fitted loosely and movably in the housing, and wedge insertion holes bored in the housing and the hook in the longitudinal direction, whereby when the wedge is driven into the joint shoe along the wedge insertion holes, the hook is retracted to engage with the supporting piece of the flange at an arbitrary position, and the tip of the housing is pushed outward into close contact with the outer surface of the columnar member.

There is also provided, according to the invention, a support system which comprises columnar members each provided with a plurality of flanges spaced apart along the longitudinal direction of the columnar members, connecting members each provided with joint shoes at end portions thereof, and wedges to be driven into the joint shoes, wherein the flanges are each provided with a supporting piece along the circumferential direction thereof, and the joint shoes each comprises a hollow housing having a pair of opposed wall bodies, and a hook fitted loosely and movably in the housing, the wall bodies and the hook being provided with respective wedge insertion holes opposed to each other, and the hook being provided at an end portion thereof with a catch portion to be disengageably engaged with the supporting piece of the flange, whereby when the wedge is driven into each of the wedge insertion holes in the condition where the catch portion is opposed to the supporting piece, the hook is retracted to engage the catch portion with the supporting piece, and an end portion of each of the wall bodies is pushed outward into contact with the outer surface of the columnar member.

There is provided, according to the invention, another support system which comprises columnar members each provided with a plurality of flanges spaced apart along the longitudinal direction of the columnar members, connecting members each provided with joint shoes at end portions thereof, and wedges to be driven into the joint shoes, wherein the flanges are each provided with a supporting piece along the circumferential direction thereof, and the joint shoes each comprises a hollow housing having a pair of opposed wall bodies, and a hook fitted loosely and movably in the housing, the wall bodies and the hook being provided with respective wedge insertion holes opposed to each other, the hook being provided at an end portion thereof with a catch portion to be disengageably engaged with the supporting piece of the flange, and spacers are provided on the outer periphery of the columnar member in parallel to the flanges, whereby when the wedge is driven into each of the wedge insertion holes in the condition where the catch portion is opposed to the supporting piece, the hook is retracted to engage the catch portion with the supporting piece, and end portions of the wall bodies are pushed outward into contact with the outer surface of the spacer and the outer surface of the flange.

There is provided, according to the invention, a further support system which comprises columnar members each provided with a plurality of flanges spaced apart along the longitudinal direction of the columnar members, connecting members each provided with joint shoes at end portions thereof, and wedges to be driven into the joint shoes, wherein the flanges are each provided with a dovetail groove having a narrow aperture portion along the circumferential direction, and the joint shoes each comprises a hollow housing having a pair of opposed wall bodies, and a hook fitted loosely and movably in the housing, the wall bodies and the hook being provided with respective wedge insertion holes opposed to each other, and the hook being provided at an end portion thereof with a rotatable catch portion to be disengageoubly engaged with the dovetail groove of the flange, whereby when the wedge is driven into the wedge insertion holes in the condition where the catch portion is fitted in the dovetail groove, the hook is retracted into engagement with an inner wall of the dovetail groove, and an end portion of each of the wall bodies is pushed outward into contact with the outer surface of the columnar member or the outer surface of the flange.

Operations of this invention are as follows.

With the wedge driven into the joint shoe, the hook engaged with the supporting piece or the dovetail groove of the flange is retracted within the joint shoe, upon which the engagement of the hook with the flange is fixed, and the end portion or portions of the housing are simultaneously brought into contact with the outer surface of the columnar member or with the outer surfaces of the spacer and the flange.

In this case, one side edge of the wedge is brought into contact with the aperture edges of the wedge insertion holes bored in the joint shoe, whereas the other side edge of the wedge is brought into contact with the aperture edge of the wedge insertion hole bored in a base end portion of the hook. Thus, the wedge is not brought into direct contact with the outer periphery of the flange and which the hook is engaged.

Besides, since the supporting piece or the dovetail groove provided at an outer peripheral portion of the flange is provided along the circumferential direction of the flange, it is possible to connect freely the connecting members, as transverse members, to the columnar member, which is erected as a longitudinal member, in arbitrary directions relative to the columnar member.

DESCRIPTION OF THE PREFERRED EMBODIMENT

This invention will now be described in detail below while referring to the embodiments shown in the drawings.

Figures 1, 2:
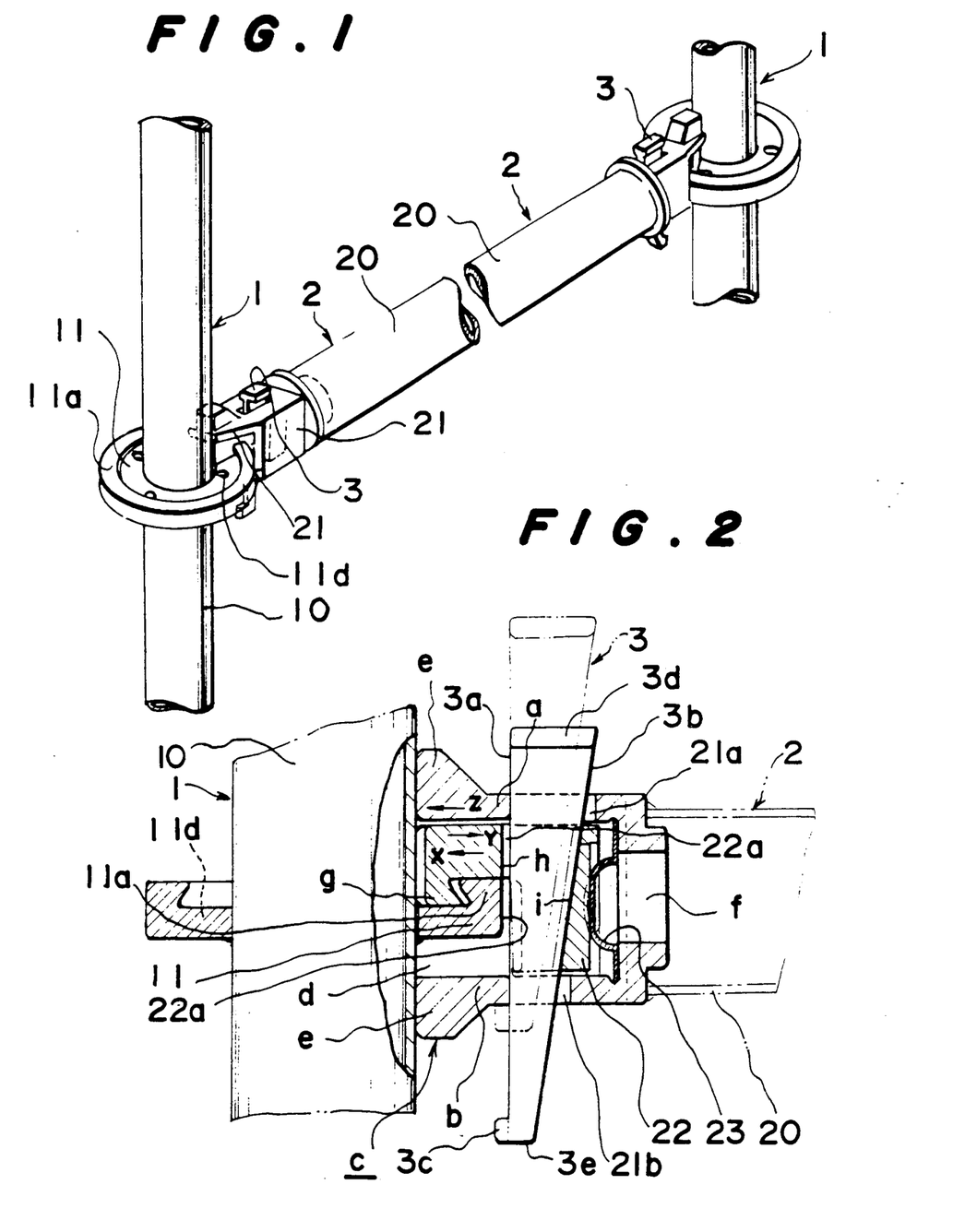
FIG. 1 is a perspective view, with a portion broken away, of a support system according to one embodiment of this invention.
FIG. 2 is a fragmentary enlarged sectional view of the support system.

As shown in FIG. 1, a support system according to this invention comprises columnar members 1, made to serve as longitudinal members, and connecting members 2 made to serve as transverse members or diagonal members. A multiplicity of the columnar members 1 and a multiplicity of the connecting members 2 are connected together by use of wedges 3 to construct a temporary scaffolding, a timbering, or a pillar, a tower or the like.

The columnar member 1 comprises a tubular main body 10 and a multiplicity of annular flanages 11 provided on the outer peripheral surface of the main body 10.

A jack, not shown, is connected to the lower end of the tubular main body 10, and is erected on the ground or the like, whereby the main body 10 is adjusted to a predetermined level and erected.

In addition, the same tubular main body 10 as the above-mentioned is connected to the upper end of the above-mentioned main body 10, though not shown, whereby the columnar member 1 is extended upward to serve as the lognitudinal member.

Further, an auxiliary body may be optionally connected to the upper end of the uppermost tubular main body 10, though not shown, the auxiliary body being also provided with the same annular flange 11 as the above-mentioned, fixed to the outer peripheral surface thereof.

The length and diametral size of the tubular main body are set according to the use of this inventive system, and are essentially arbitrary.

In connecting the tubular main bodies 10 to each other, appropriate connecting means are used, though not shown.

The tubular main body 10 comprises a pipe with circular cross-sectional shape in the embodiment shown, by may also be constituted of a pipe with a polygonal cross-sectional shape.

The flanges 11 are arranged on the outer peripheral surface of the tubular main body 10 at appropriate intervals along the axial direction of the main body 10, and are fixed to the outer peripheral surface by welding or the like, as shown in FIG. 2.

The flanges each have a predetermined radial width.

The flange comprises a plinth-like supporting piece 11a along the cicumferential direction at the outer peripheral portion thereof, and is provided with a drain hole 11d bored through a horizontal portion thereof. The supporting piece 11a serves as an engaging portion of the flange 11.

Figure 4:
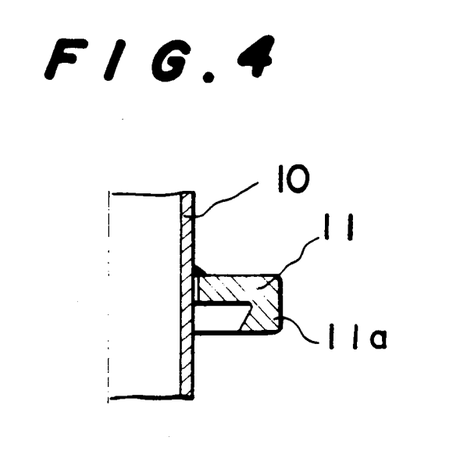
FIGS. 4, 5, 6 and 7 are each a fragmentary enlarged sectional view illustrating a modification of a flange.

The supporting piece 11a is provided on the upper side of the outer peripheral portion of the flange 11 in the embodiment shown, but may be provided on the lower side of the outer peripheral portion of the flange 11, as shown in FIG. 4.

Figure 5:
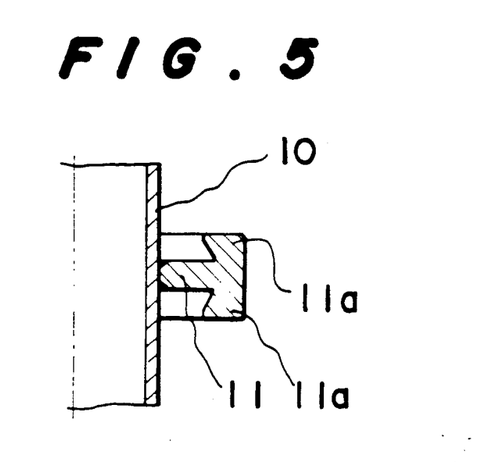

As for the sectional shape of the flange, the flange 11 may be made to be T-shaped or somewhat T-shaped in section by providing the supporting piece 11a on the upper and lower sides of the outer peripheral portion of the flange, as shown in FIG. 5.

Figure 6:
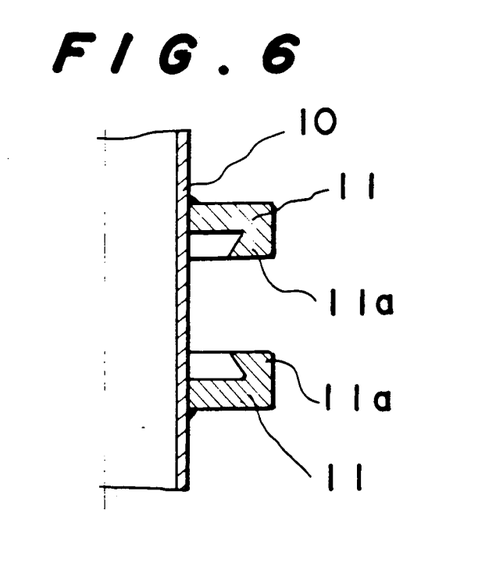

Further, the flange 11 may have a so-called double structure, as shown in FIG. 6, in which the supporting pieces 11a at the outer peripheral portions of the upper and lower flange structures are opposed to each other with an appropriate spacing therebetween.

Figure 7:
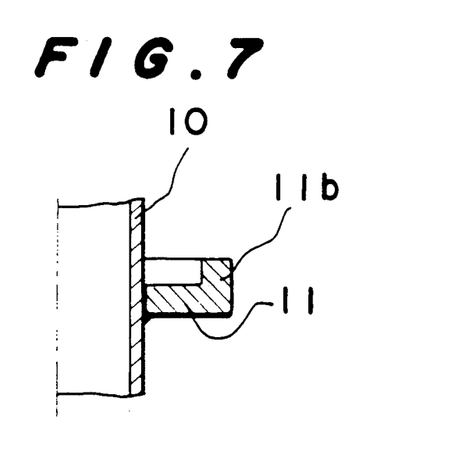

Moreover, as shown in FIG. 7, the flange 11 may be provided with a perpendicular plinth-like rib 11b instead of the supporting piece 11a.

Figure 3:
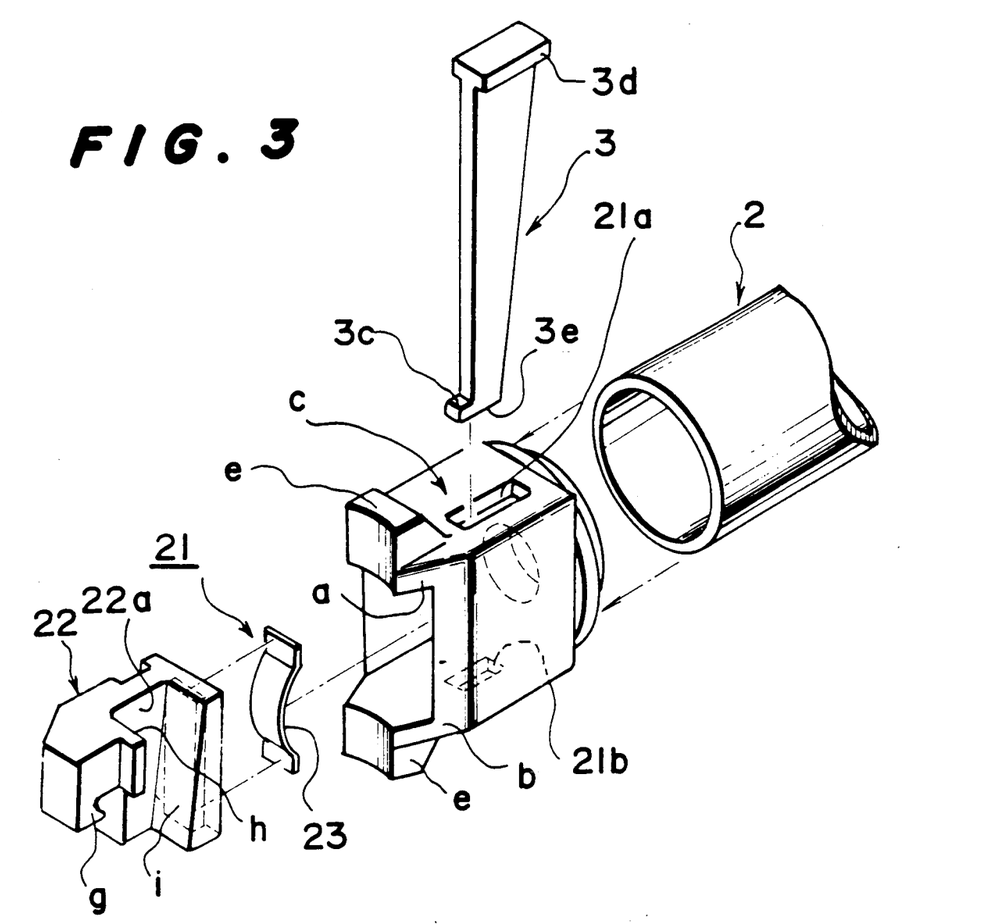
FIG. 3 is an exploded perspective view of an end portion of a connecting member.

The connecting member 2 comprises a tubular main body 20 and joint shoes 21 fixed to both ends of the main body 20, with a hook 22 loosely fitted in each of the joint shoes 21.

The length of the tubular main body 20 is set according to the use of the inventive system, and is essentially arbitrary.

The tubular main body 20 may be formed to have a fixed length or may be formed as an expandable body.

It is natural that the length of the tubular main body 20 where the connecting member 2 is used as a transverse member may be different from the length of the main body 20 where the connecting member 2 is used as a diagonal member.

It is also natural that though the tubular main body 20 comprises a pipe with a circular sectional shape in the embodiment shown, the main body may be constituted of a pipe with a polygonal sectional shape.

As shown in FIGS. 2 and 3, the joint shoe 21 is formed in a shape resembling a bird's bill, and the above-mentioned hook 22 is loosely fitted in the interior, or a central portion, of the joint shoe 21.

Namely, the joint shoe 21 comprises a housing c having a pair of wall bodies a, b opposed to each other vertically and the hook 22 loosely fitted in a hollow or chamber d of the housing c so as to be freely movable in the direction of arrows x and y.

Reinforcing thicker portions e, e are provided near the front ends of the housing c, and a hole f for mounting a brace is bored in a substantially central portion of the rear end of the housing c.

The joint shoe 21 has wedge insertion holes 21a, 21b bored through the material thickness thereof.

The hook 22, on the other hand, is provided at a tip portion thereof with a hook-shaped catch potion g to be disengageably engaged with the supporting piece 11a of the flange 11.

The hook 22 is further provided at a rear end portion thereof with a wedge insertion hole 22a, which comprises a perpendicular surface h and a taper surface i and is set in register with the wedge insertion hole 21a bored through the joint shoe 21.

Besides, in this embodiment the hook 22 in a forward direction (the direction x in FIG. 2) from the rear side by an elastic member or elastic means 23 such as a leaf spring, a coil spring, a rubber, etc.

The wedge 3 should only be so formed as to be inserted in or through the above-mentioned wedge insertion holes 21a, 21b and 22b. In this embodiment, the wedge 3 is so formed that the extension lines of one side edge 3a and the other side edge 3b of the wedge form a V.

The wedge 3 is provided with a stopper portion or a catch portion 3c having an edge line orthogonal to the one side edge 3a, at the lower end of the one side edge 3a which formed as a pointed end of the wedge.

In addition, the wedge 3 is provided with a flange portion 3d at the upper end thereof. The flange portion 3d is so formed that it is possible to drive in or draw out the wedge 3 by striking the flange portion 3d by an appropriate tool such as a hammer.

When the wedge 3 is driven into the wedge insertion holes 21a, 21b bored through the joint shoe 21, the one side edge 3a of the wedge is brought into contact with the aperture edges of the wedge insertion holes 21a, 21b, whereas the other wide edge 3b of the wedge is brought into contact with the taper surface i of the wedge insertion hole 22a bored through the hook 22.

Therefore, the hook 22 is drawn into the housing of the joint shoe 21, in the direction of arrow y in FIG. 2, and is pressed against the supporting piece 11a of the flange 11.

Namely, when the catch portion g of the hook 22 is preliminarily opposed to the supporting piece 11a of the flange 11 and then the wedge 3 is driven in, the hook 22 is retracted in the direction of the arrow y against the elastic member 23, while, on the other hand, the housing c is moved in the direction of z, and the tips of the housing c are brought into close contact with the outer periphery of the tubular main body 10 serving as the columnar member 1.

Therefore, vertical loads exerted on the connecting member 2 during use of this inventive system are borne by the tubular main body 10 through the tips of the housing c, so that stress concentration will not occur on the flange 11, and the connecting member 2 will remain stable in a well-balanced condition.

When the tip portions of the housing c of the joint shoe 21 are brought into contact with the outer peripheral surface of the tubular main body 10, the outer peripheral surface may undegto the so-called marring. It is possible to obviate the arring phenomenon, by affixing a protective cover 12 comprising a pipe or the like to the outer peripheral surface of the tubular main body 10, as shown in FIG. 8.

Figure 8:
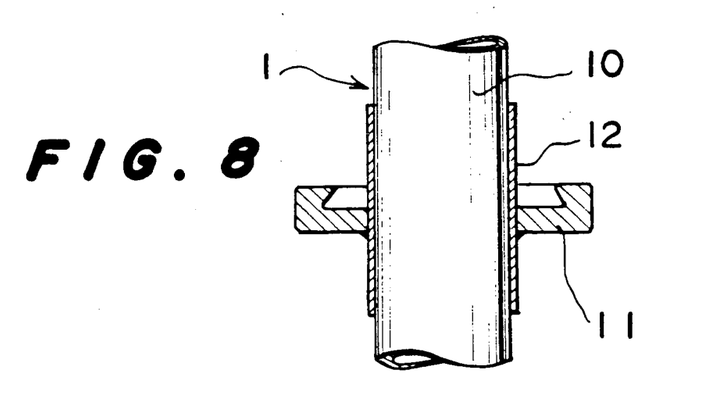
FIG. 8 is a fragmentary sectional front view of a protective cover.

The protective cover 12 may be formed in a hollow cylindrical shape with a flange 11 fixed integrally on the outer periphery thereof, as shown in FIG. 8, and may be fixed to the outer periphery of the tubular main body 10 by welding or the like. Alternatively, the protective cover 12 may be fixed to the outer periphery of the tubular main body 10 by welding or the like, followed by fixing flange 11 integrally on the outer periphery of the protective cover 12.

At the time of using the support system according to this invention, constructed as mentioned above, to form a prefabricated scaffolding, for instance, it suffices to erect a plurality of the columnar members at desired appropriate intervals and connect a plurality of the connecting members 2 to the erected columnar members 1 by use of the wedges 3.

Since the supporting pieces 11a of the flanges 11 of the columnar member 1 are each formed in an annular shape, it is possible to connect freely the connecting members, used as braces or horizontal diagonal members or the like, to the columnar member 1.

For disconnecting the columnar members 1 and the connecting members 2 thus connected to each other, it suffices to draw out the wedges 3 from the joint shoes 21, in a manner reverse to the above.

In that case, a lower end portion 3e of the wedge 3 is struck upward with a hammer or the like.

In the operation of drawing out the wedge 3, the wedge 3 is gradually drawn out of the joint shoe 21, when the hook 22 loosely fitted in the joint shoe 21 is protruded to the exterior of the joint shoe 21 under the biasing force exerted by the elastic member 23.

Therefore, the sliding of the hook 22 to the outside of the joint shoe 21 causes the one side edge 3a of the wedge 3 to make sliding contact with the aperture edge of the wedge insertion hole 21a of the joint shoe 21, and the stopper portion 3c at the point end of the wedge 3 is caught by the aperture edge of the wedge insertion hole 21b. Accordingly, complete separation of the wedge 3 from the joint shoe 21 is inhibited, and the possibility of the wedge 3 being lost is precluded.

Figure 9:
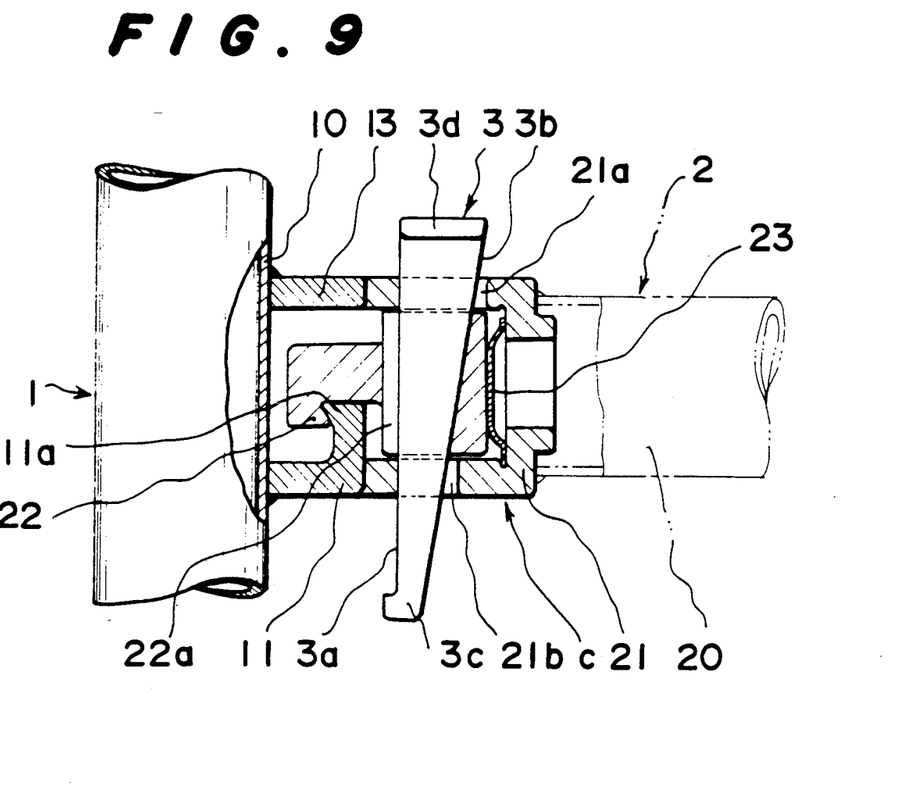
FIG. 9 is a fragmentary enlarged sectional, similar to FIG. 2, of a support system according to another embodiment of the invention.

FIG. 9 illustrates another embodiment of this inventive system.

In this embodiment, the form of the columnar member 1 is greatly different from that in the above-mentioned embodiment, and an appropriate modification is made in the connection member 2 accordingly.

Namely, in this embodiment, the columnar member 1 is provided with flanges 11 fixed on the outer peripheral surface of a tubular main body 10 and with spacers 13 also fixed on the outer periphery of the main body 10, the protrusion size of the outer peripheral end of the spacer 13 being equal to that of the flange 11.

The tips of a joint shoe 21 provided on the connecting member 2 are brought into contact with the outer peripheral ends of the flange 11 and the spacer 13.

Briefly, in this embodiment, the tips of the housing c of the joint shoe 21 are not brought into contact with the outer periphery of the tubular main body 10 constituting the columar member 1 but are brought into close contact with the outer surface of the spacer 13 and the outside surface of the flange 11. The other operations and effects of this embodiment are the same as those of the above-mentioned embodiment illustrated in FIG. 2.

It is natural that a supporting piece 11a is provided on the upper surface of the outer peripheral end of the flange 11.

It also natural that a gap sufficient for insertion of a hook 22, described later, is provided between the upper end of the supporting piece 11a and the spacer 13 disposed thereabove.

On the other hand, on the connecting member 2, naturally, a hook 22 is loosely fitted in a joint shoe 21, and the tip of the hook 22 protrudes outward beyond the tips of the joint shoe 21.

Namely, the design just mentioned permits easy guide of the hook 22 through the above-mentioned gap to the side of the flange 11.

It also goes without saying that the joint shoe 21 is provided with a wedge insertion hole 21a tunneling therethrough, and the hook 22 is provided with a wedge insertion hole 22a bored therethrough.

The wedge 3, naturally, is driven into the wedge insertion holes 21a, 22a.

In this embodiment, the hook 22 protrudes out of the joint shoe 21, which ensure good operability in engaging the hook 22 with the supporting piece 11a of the flange 11.

Besides, the supporting piece 11a of the flange 11 is covered by the spacer 13 thereabove, in a manner of a protective cover; therefore, for example, deposition of mortar on the supporting piece 11a is prevented.

Figure 10:
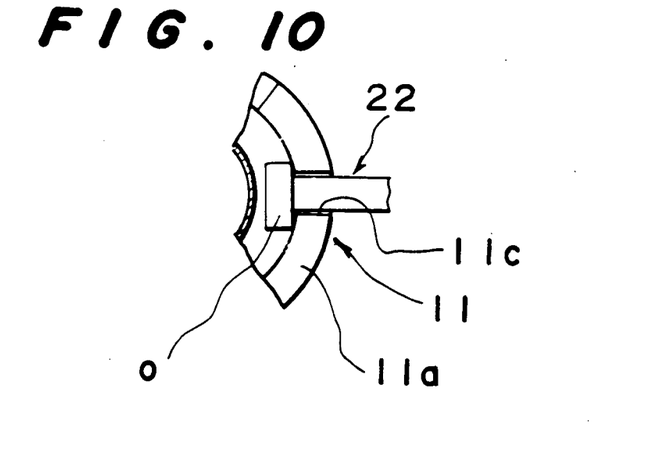
FIG. 10 is a fragmentary plan view illustrating a modification of the flange.

FIG. 10 shows a further embodiment of this invention, which resides in modification in the flange 11 and the hook 22 connected thereto.

Namely, the flange 11 is provided with a multiplicity of cutouts 11c in supporting piece 11a thereof, spaced along the circumferential direction.

On the other hand, the hook 22 is provided with a T-shaped catch portion o at the tip thereof.

A base end portion of the hook 22 is inserted in through the cutout 11c, and the T-shaped catch portion o at the tip of the hook 22 is set to be caught by the inner periphery of the supporting piece 11a of the flange 11.

In this case, the catch portion o may be inserted into the cutout 11c from above, or may be fitted in position by rotating the catch portion o using a rotatable joint.

According to this embodiment, when the connecting member 2 as the transverse member is connected to the columnar member 1 as the longitudinal member, the direction of the connecting member 2 is specified, but there is the merit of extremely strong engagement of the hook 12 with the supporting piece 11a of the flange 11.

Figure 11:
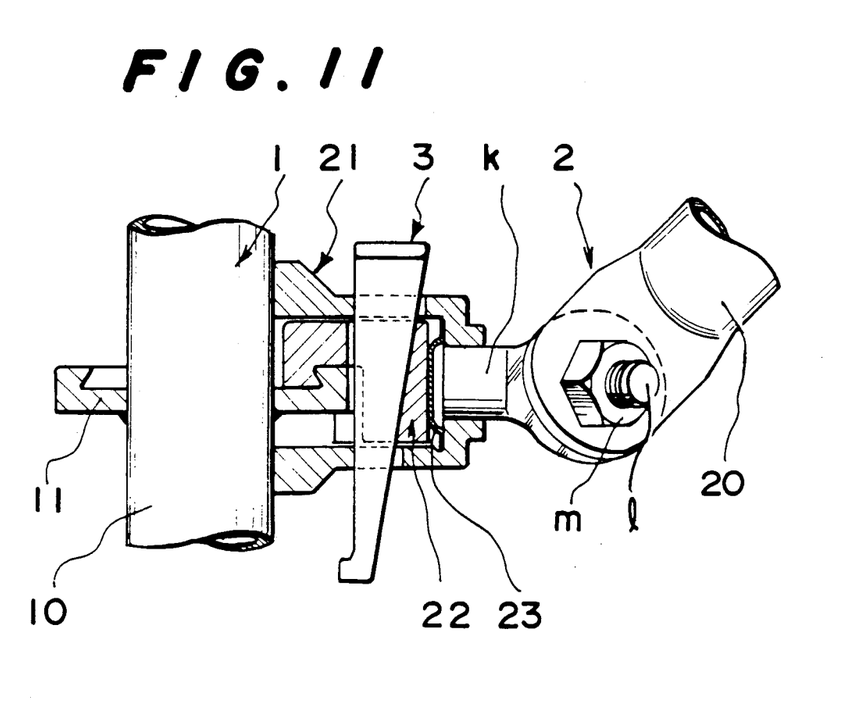
FIG. 11 is a fragmentary enlarged sectional view, similar to FIG. 2, of an embodiment of the support system in which a diagonal member is connected to the joint shoe.

FIG. 11 shows a further embodiment of the connecting member in this inventive system, in which a joint k is fixed by use of a hole f bored in a housing c constituting the joint shoe 21, and a tubular main body 20 as a diagonal member is rotatably fitted to the joint k through a bolt l and nut m.

According to this embodiment, the diagonal member functions as a diagonal member for reinforcing a so-called vertical frame composed of the longitudinal columnar members 1 and the transverse connecting members 2, and also as a diagonal member for reinforcing a so-called horizontal frame composed of the transverse connecting members 2.

Figure 12:
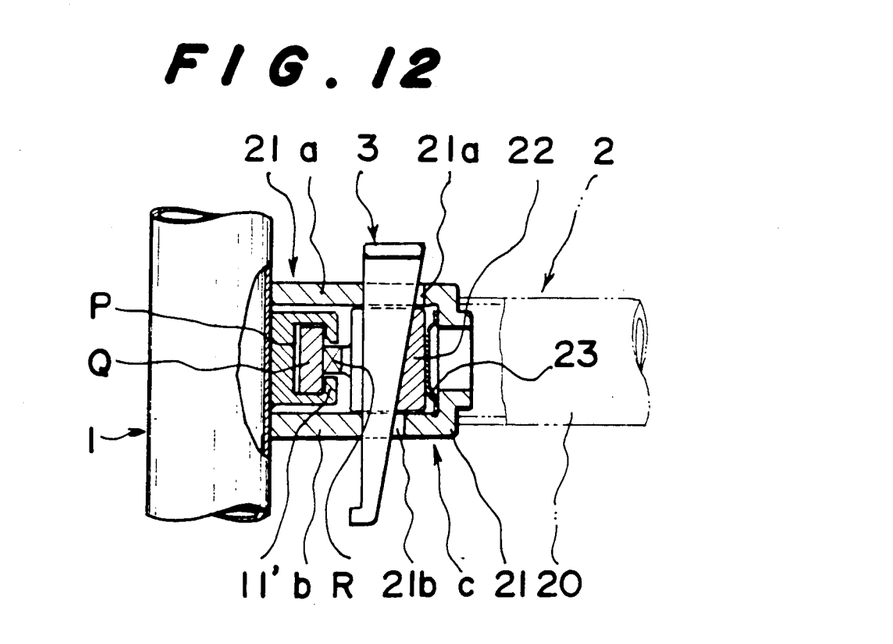
FIGS. 12, 13 and 14 are each a fragmentary enlarged sectional view of a support system according to a further embodiment of the invention.

FIG. 12 pertains to a still further embodiment of this invention.

In this embodiment, a thick flange 11' is provided with a dovetail groove P, having a narrow opening portion, along the circumferential direction, and a catch portion Q provided at a tip portion of the hook is disengageably engaged in the dovetail groove P.

The catch portion Q is connected to the hook 22 through a rotatable joint R.

The other constituents are the same as those in FIG. 2.

Figure 13:
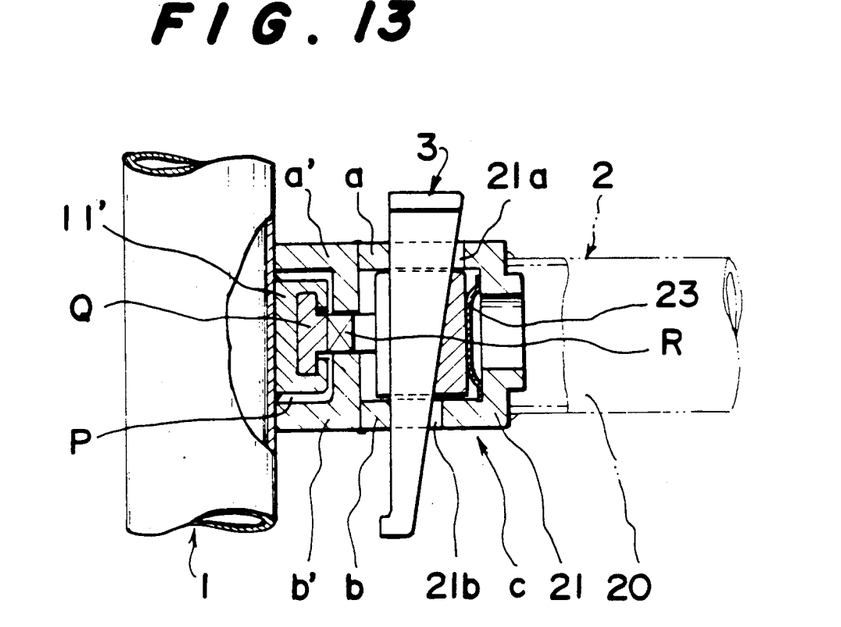

FIG. 13 shows a modification of the embodiment illustrated in FIG. 12. In this modificatior wall bodies a', b' are jointed to the above-mentioned wall bodies a, b.

Figure 14:
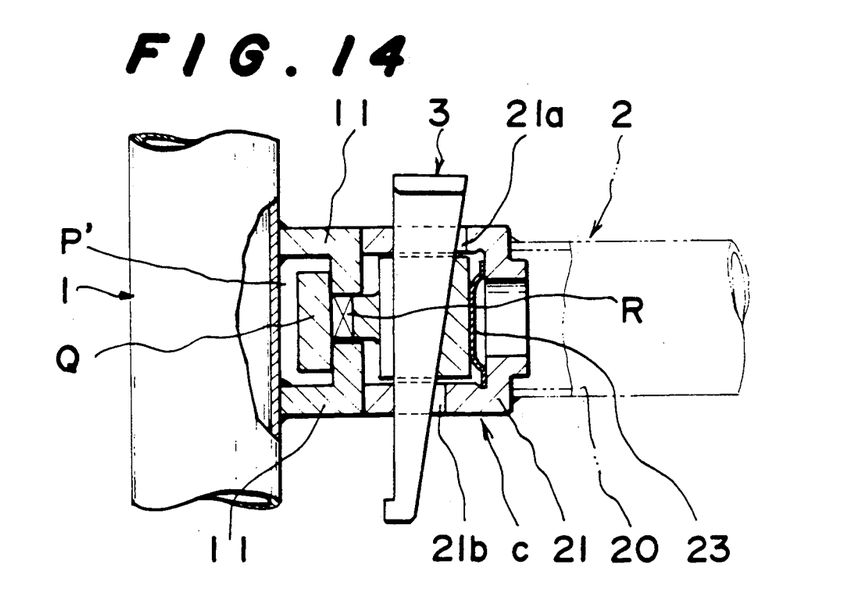

FIG. 14 shows an embodiment in which a pair of upper and lower flanges 11, 11 are provided to face each other, a dovetail groove P' is provided between the flanges 11 and 11, and a catch portion Q is fitted in the dovetail groove P'.

Figure 15:
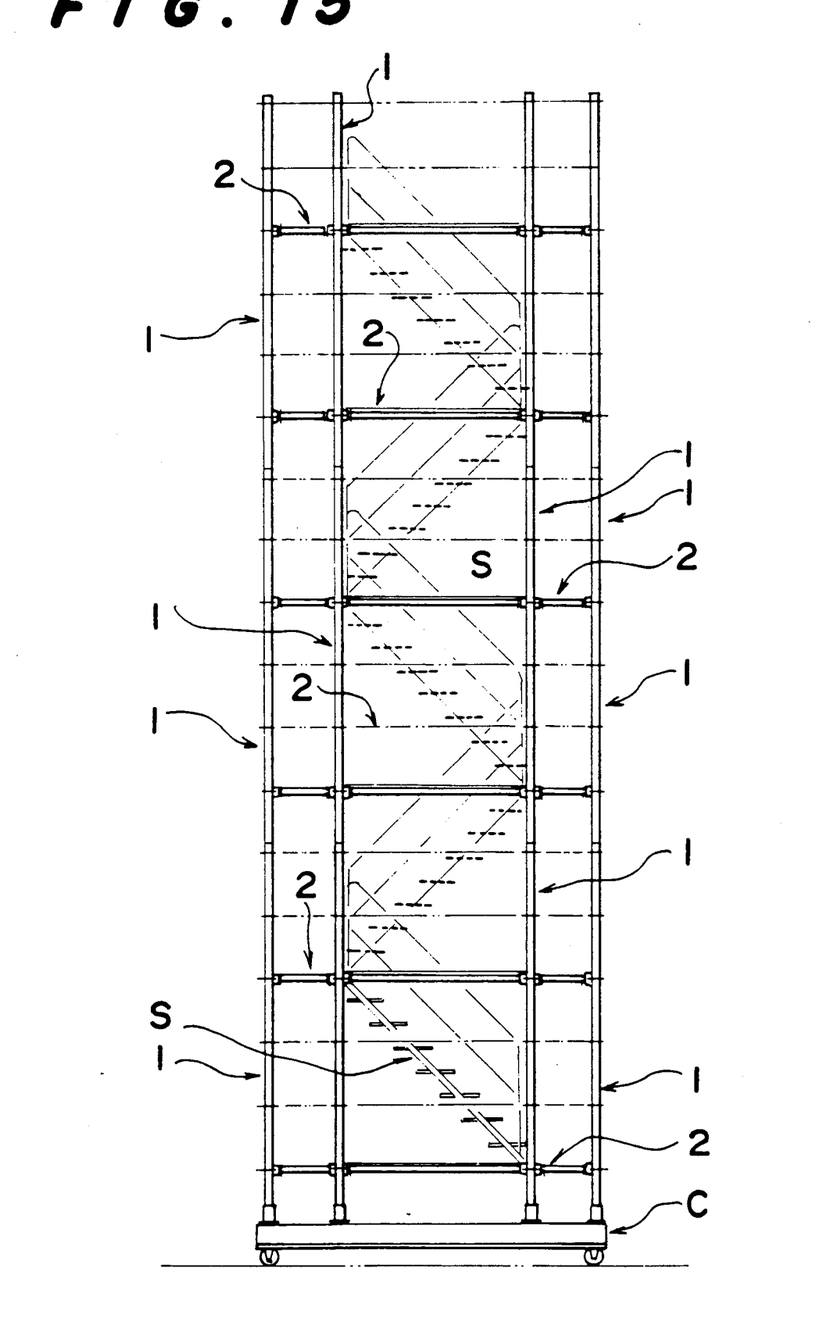
FIG. 15 is a front view of an embodiment of a prefabricated scaffolding as a temporary scaffolding, formed by use of the support system according to the invention.

FIG. 15 illustrates an embodiment of a prefabricated scaffolding, as a temporary scaffolding, formed by use of the support system according to this invention. The prefabricated scaffolding comprises a multiplicity of columnar members 1 erected upright at appropriate intervals and extended upward, and a multiplicity of longer and shorter connecting members connecting the columnar members 1 together sideways.

If required, auxiliary bodies (not shown) are connected to the columnar members 1.

The lowermost columnar members 1, in this embodiment, are erected on a carrier truck C, and ladders S are attached to some of the connecting members 2.

Connection of the columnar members 1, connecting members 2 and ladders S to each other is naturally carried out by use of the wedges 3 (not shown).

According to this embodiment, it is possible to form easily, by use of this inventive system, a prefabricated scaffolding as a temporary scaffolding, in desired dimensions over wide longitudinal and transverse ranges.

Figure 16:
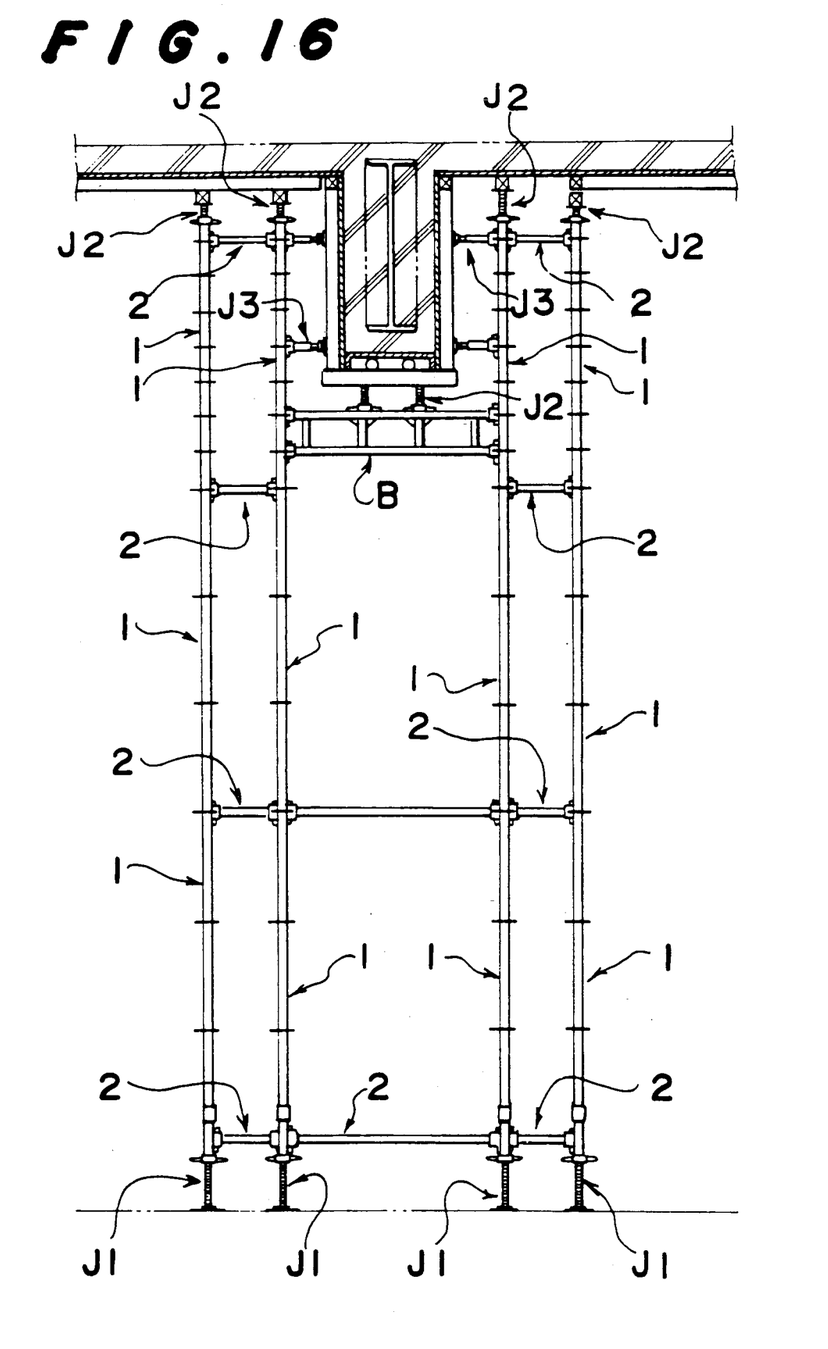
FIG. 16 is a front view of an embodiment of a panel support as a timbering, constructed by use of the support system according to the invention.
Figure 17:
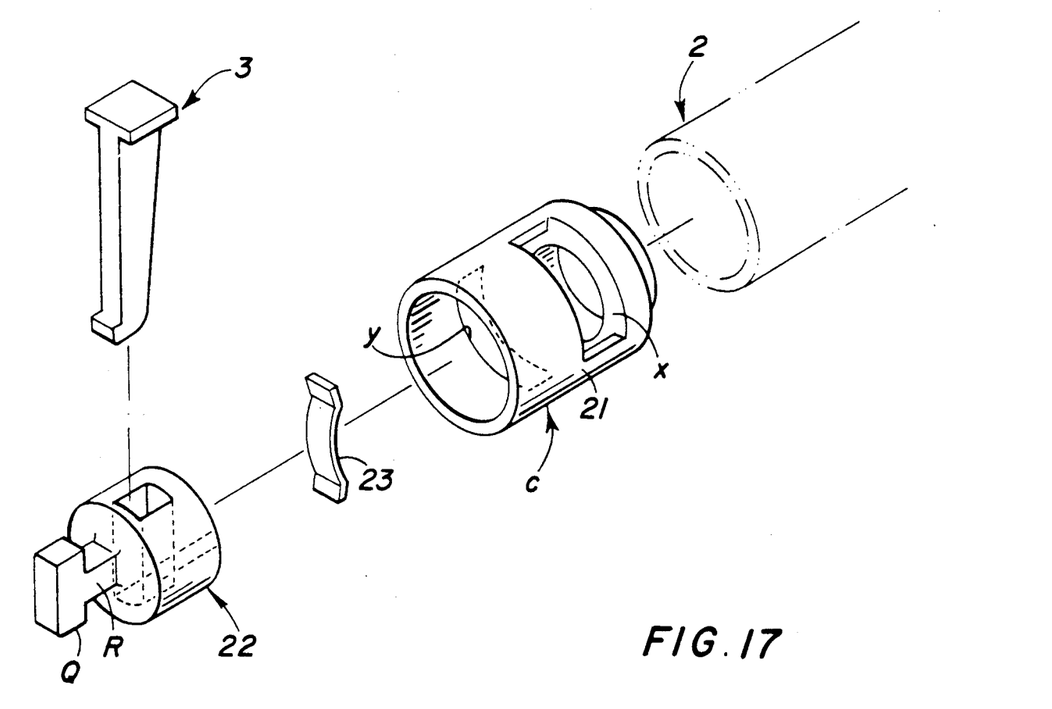
FIG. 17 is an exploded view of the embodiment of FIGS. 10, 13 and 14.

FIG. 16 illustrates an embodiment of a panel support as a timbering, constructed by use of this inventive system, comprising a multiplicity of columnar members erected upright at appropriate intervals and extended upward, and a multiplicity of longer and shorter connecting members 2 connecting the columnar members 1 together sideways.

Jacks J1 are provided at the lower ends of the lowermost columnar members 1, whereas expansion adjustors J2 are provided at the upper ends of the uppermost columnar members 1.

Further, the assembled system as a whole is provided with a mold adjustor J3 and a prefabricated beam B.

Connection of the columnar members 1 and connecting members 2 to each other and connection of the prefabricated beam B are naturally carried out by use of the wedges 3 (not shown).

According to this embodiment, it is possible to obtain easily a panel support as a timbering best suited to the scale and form of the intended reinforced concrete body.

Though the above-mentioned embodiments have been explained referring to the cases where the inventive system is used as a temporary scaffolding or temporary system in a construction site, the inventive system may naturally be used as a temporary scaffolding or temporary system in a shipbuilding site.

As has been described above, the system according to this invention makes it possible to engage the hooks loosely fitted in the joint shoes with the supporting pieces of the flanges, and to maintain fixedly the engaged condition by driving the wedges into the joint shoes. There is therefore a merit that, by erecting the columnar members as longitudinal members and connecting the connecting members as transverse or diagonal members to the erected columnar members, it is possible to easily construct not only a temporary scaffolding such as a prefabricted scaffolding or a temporary system such as a panel support in a predetermined manner, but also a relatively long-lasting structure such as a truss-type pillar, tower, etc.

In addition, the system according to this invention is so designed that when the wedge is driven in, the hook is retracted to engage with the supporting piece of the flange, and the tips of the housing constituting the joint shoe comes into contact with the outer surface of the columnar member or the outer surfaces of the flange and the spacer. Therefore, the joint shoe is supported at two points, and vertical loads exerted on the connecting member are borne on the two supporting points, so that stress concentration will not occur on the flange. Thus, the flanges are effectively prevented from being broken, and the connecting members are connected in a stable condition.

Moreover, the system according to this invention is capable of being used repeatedly, with repeated driving of the wedges into the joint shoes, without the wedges being pressed against the flanges. Therefore, abrasion or wear of the flanges will not arise from the repeated use of the system. Thus, there is the merit of remarkable enhancement of the durability of not only a temporary scaffolding such as a prefabricated scaffolding or a temporary system such as a panel support but also a relatively long-lasting structure such as a truss-type pillar, tower, etc.

Furthermore, in the system according to this invention the supporting piece provided at the outer peripheral end of the flange is annular in shape, which provides a merit that it is possible to connect an arbitrary number of the connecting members as transverse members to the erected columnar members constituting the longitudinal members, from arbitrary directions relative to the columnar members.

What is claimed is:

1. A support system which comprises cloumnar members each provided with a plurality of flanges spaced apart along the longitudinal direction of the columnar members, ccnnecting members each provided with joint shoes at end portions thereof, and wedges to be driven into the joint shoes, wherein the flanges are each provided with a supporting piece along the circumferential direction thereof, and the joint shoes each comprises a hollow housing having a pair of opposed wall bodies, and a hook fitted loosely and movably in the housing, the wall bodies and the hook being provided with respective wedge insertion holes opposed to each other, and the hook being provided at an end portion thereof with a catch portion to be disengageably engaged with the supporting place of the flange, whereby when the wedge is driven into each of the wedge insertion holes in the condition where the catch portion is opposed to the supporting piece, the hook is retracted to engage the catch portion with the supporting piece, an end portion of each of the wall bodies is pushed outward into contact with the outer surface of the columnar member and an elastic member is provided at an inner rear portion of the housing to constantly bias the hook to the outside of the housing.

2. The support system as set forth in claim 1, wherein said supporting piece is plinth-shaped in cross section.

3. The support system as set forth in claim 1, wherein said catch portion is one of L- and T-shaped in cross section.

4. The support system as set forth in claim 1, wherein the supporting piece is provided with a plurality of cutouts spaced along the circumferential direction thereof, and a tip portion of the hook is caused to penetrate the cutout to the inner periphery side of the supporting piece.

5. The support system as set forth in claim 1, wherein a protective cover is fitted over the outer periphery of the columnar member, and the end portions of the wall bodies make contact with the outer periphery of the protective cover.

6. The support system as set forth in claim 1, wherein a cylindrical protective cover is firmly fitted on the the outer periphery of the columnar member, and the flange is secured to the outer periphery of the protective cover.

7. A support system which comprises columnar members each provided with a plurality of flanges spaced apart along the longitudinal direction of the columnar members, connecting members each provided with joint shoes at end portions thereof, and wedges to be driven into the joint shoes, wherein the flanges are each provided with a supporting piece along the circumferential direction thereof, and the joint shoes each comprises a hollow housing having a pair of opposed wall bodies, and a hook fitted loosely and movably in the housing, the wall bodies and the hook being provided with respective wedge insertion holes opposed to each other, the hook being provided at an end portion thereof with a catch portion to be disengageably engaged with the supporting piece of the flange, and spacers are provided on the outer periphery of the columnar member in parallel to the flanges, whereby when the wedge is driven into each of the wedge insertion holes in the condition where the catch portion is opposed to the supporting piece, the hook is retracted to engage the catch portion with the supporting piece, and end portions of the wall bodies are pushed outward into contact with the outer surface of the spacer and the outer surface of the flange and an elastic member is provided at an inner rear portion of the housing to constantly bias the hook to the outside of the housing.

8. A support system which comprises columnar members each provided with a plurality of flanges spaced apart along the longitudinal direction of the columnar members, connecting members each provided with joint shoes at end portions thereof, and wedges to be driven into the joint shoes, wherein the flanges are each provided with a dovetail groove having a narrow aperture portion along the circumferential direction, and the joint shoes each comprises a hollow housing having a pair of opposed wall bodies, and a hook fitted loosely and movably in the housing, the wall bodies and the hook being provided with respective wedge insertion holes opposed to each other, and the hook being provided at an end portion thereof with a rotatable catch portion to be disengageably engaged with the dovetail groove of the flange, whereby when the wedge is driven into the wedge insertion holes in the condition where the catch portion is fitted in the dovetail groove, the hook is retracted into engagement with an inner wall of the dovetail groove, an end portion of each of the wall bodies is pushed outward into contact with the outer surface of the columnar member of the outer surface of the flange and an elastic member is provided at an inner rear portion of the housing to constantly bias the hook to the outside of the housing.

9. The support system as set forth in claim 8, wherein the dovetail groove is provided in the flange itself.

10. The support system as set forth in claim 8, wherein the dovetail groove is provided between a pair of opposed upper and lower flanges.

11. The support system as set forth in claim 8, wherein the catch portion is hook-, L- or T-shaped in cross section, and is connected to an end portion of the hook through a rotable joint.

12. The support system as set forth in claim 1, 7 or 8, wherein the connecting member is made to be a horizontal member serving as a transverse member for the columnar member serving as a longitudinal member or is made to be a brace member serving as a diagonal member for the columnar member.

13. The support system as set forth in claim 1, 7 or 8, wherein the wedge is provided with a stopper portion at a pointed end thereof so that the stopper portion is fastened to the aperture edge of the wedge insertion hole bored in the joint shoe.

14. The support system as set forth in claim 1, 7 or 8, made to be a prefabricated scaffolding system or suspended scaffolding system constituting a temporary scaffolding.

15. The support system as set forth in claim 1, 7 or 8, made to be a panel support system serving as timbering or to be a stationary or movable tower system.

16. A support system, comprising:
   columnar members each provided with a support flange;
   a connecting member for connection with the columnar member;
   a housing connected to said connecting member, said housing having a hollow structure defining a chamber, said housing having a first and second opening;
   a hook element extending through said chamber passing through said first and second opening; and,
   elastic means positioned in said chamber, said elastic means for engaging said hook element and urging said hook element out of said chamber; and,
   a catch portion provided on an end of said hook.

17. A support system according to claim 16, further comprising a wedge element positionable in one of said openings and engagable with a wedge shaped opening formed in said hook for urging said hook in the direction against said elastic means thereby urging said catch portion of said hook into engagement with a corresponding catch of said support flange.

* * * * *